United States Patent [19]

Waddington

[11] 4,256,196
[45] Mar. 17, 1981

[54] ELECTRIC VEHICLE WITH WADDINGTON DRIVE

[75] Inventor: Clive Waddington, Stratford, Conn.

[73] Assignee: Avco Corporation, Stratford, Conn.

[21] Appl. No.: 20,752

[22] Filed: Mar. 15, 1979

[51] Int. Cl.³ .............................................. B60K 25/10
[52] U.S. Cl. .................................... 180/65 E; 74/117; 192/0.034
[58] Field of Search ............. 180/65 R, 65 E; 74/117, 74/750 B, 804; 192/0.032, 0.034

[56] References Cited

U.S. PATENT DOCUMENTS

| | | | |
|---|---|---|---|
| 2,778,066 | 1/1957 | Walmsley | 308/DIG. 5 |
| 3,202,234 | 8/1965 | Osborne | 180/65 E |
| 3,803,932 | 4/1974 | Waddington | 74/117 |
| 3,874,253 | 4/1975 | Waddington | 74/804 |
| 3,892,139 | 7/1975 | Harris | 74/117 X |
| 4,098,147 | 7/1978 | Waddington | 74/750 B |
| 4,153,128 | 5/1979 | Heitmeyer et al. | 180/65 E |
| 4,175,632 | 11/1979 | Lassanske | 180/65 R |

Primary Examiner—John J. Love
Assistant Examiner—Michael Mar
Attorney, Agent, or Firm—Ralph D. Gelling

[57] ABSTRACT

A vehicular drive system is presented which couples an infinitely variable automatic transmission to a constant speed electric motor. The drive system utilizes a battery powered DC motor having a no-load to full-load speed variation of less than 10 percent. The motor drives the input shaft of the transmission. The output of the transmission is coupled to drive the vehicle axle. Adjustment of the eccentricity of a cam plate within the transmission controls the speed and torque ratio between input and output shafts of the transmission. Eccentricity is varied as a function of tension on a spring in opposition to the forces developed on the cam plate by the transmitted torque. Spring tension is controlled by the pressure applied to an operator actuated accelerator pedal. The more the accelerator pedal is depressed, the greater will be vehicle acceleration and/or the steeper the hill that can be climbed.

9 Claims, 6 Drawing Figures

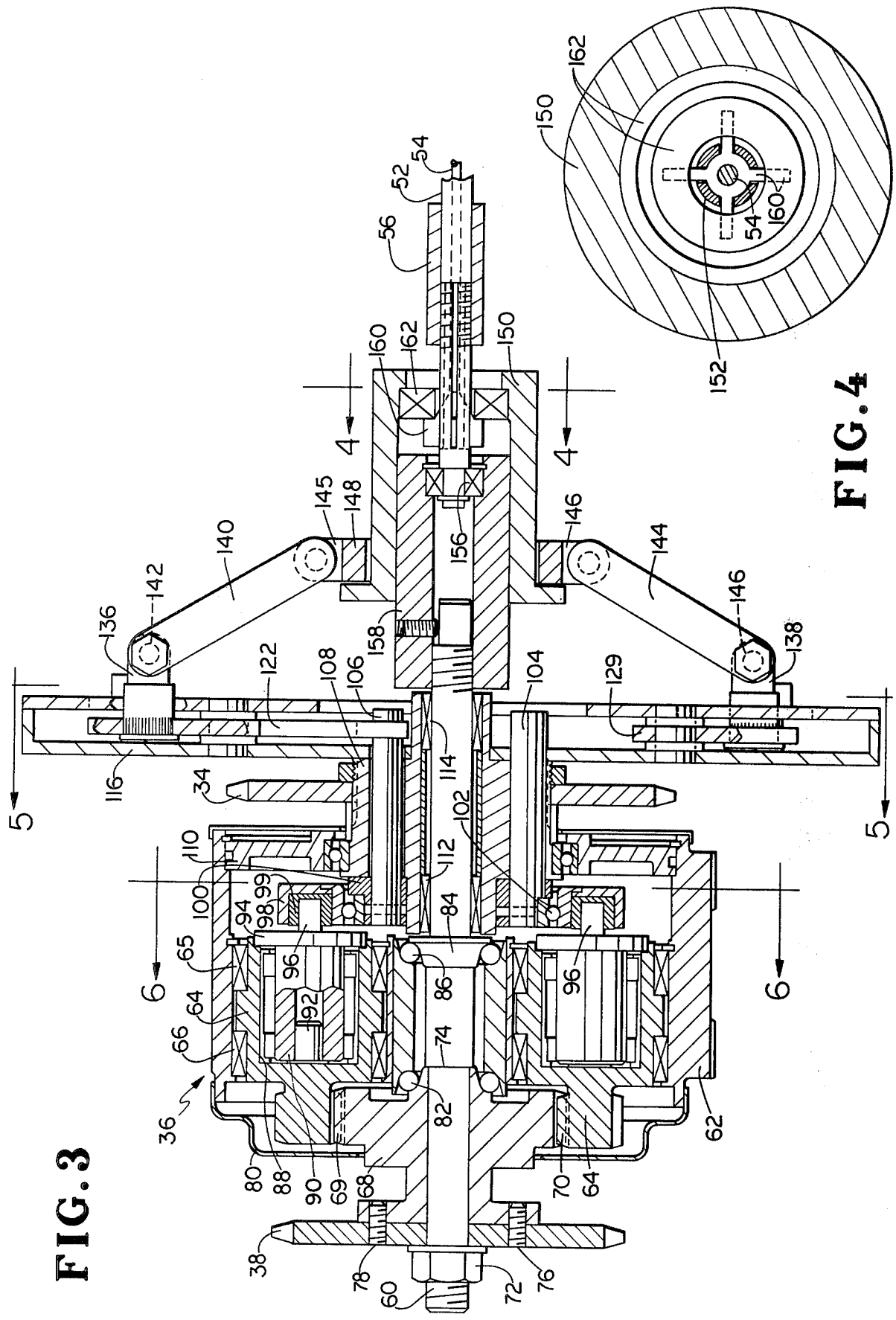

ELECTRIC VEHICLE WITH WADDINGTON DRIVE

BACKGROUND OF THE INVENTION

Direct drive electric vehicles have successfully used rheostat controllers for such applications as golf carts and personnel carriers. Rheostat control is quite efficient for transferring battery energy to shaft power at the wheels providing the vehicle is diven at maximum speed over reasonably level terrain.

Electric cars operating in stop and go city traffic and up steep hills require more complex control systems. One approach has been to develop controls which switch between the several battery terminals to provide a number of voltages for powering the electric motor. In between each of the selected voltages, rheostat, silicon controlled rectifier or other solid state device control circuit is used. This type of controller tends to be complicated in that it requires the use of high current relays, current and voltage sensors, current limiters and speed sensors.

Another solution that has been used is to include a 3 speed transmission of the conventional automotive type between the electric motor and the vehicle drive wheels. If used correctly this approach can appreciably reduce the maximum current drawn from the battery since mechanical multiplication is used to increase wheel torque rather than high current drains on the battery. However, since an electric motor draws high currents when loaded to torque values near the stall level, it has not been very practical to use a manually shifted transmission. Recent trends have been toward use of an automatic transmission with a torque converter similar to those used in current gasoline powered automobiles. The inherent inefficiency of the torque converter brings about a drop in overall efficiency for transferring battery energy to shaft power at the wheels.

This invention incorporates features from my earlier invented torque responsive transmissions (U.S. Pat. Nos. 3,803,932, 3,874,253 and 4,098,147) to vary the drive ratio between a battery powered electric motor and the output to the vehicle wheels.

The operator of a vehicle equipped with this invention, on depressing the accelerator pedal, will activate an off-on switch to energize the battery powered motor. As the electric motor comes up to rated speed, it initially has no load on it since the torque responsive Waddington drive transmission will be in a zero output speed configuration. However, as the accelerator pedal is depressed beyond the point where the motor is actuated, the Waddington drive responds by applying torque to the transmission output shaft. The resulting input-to-output shaft turning ratio will be directly related to the torque required to accelerate the vehicle versus the torque being supplied by the motor. Using the Waddington torque responsive transmission, the electric motor can run at constant speed under all operating conditions. The result is that use of my invention produces an electric vehicle which is more efficient than is available using current art.

SUMMARY OF THE INVENTION

This invention comprises apparatus for markedly improving the efficiency of a battery powered electric vehicle. At the same time, a simple mechanical control system is used. There are only a few basic components in the vehicle equipped with my invention. First, there is the power source which could be a cabled-in AC or DC supply, a locally generated DC supply or from a self contained battery. In the unit reduced to practice a 24 volt battery was used for motive energy.

Encircuited with the battery is a shunt wound DC motor. A solenoid actuated switch determines whether the motor is energized or not. The coil winding of the solenoid is encircuited with an on-off switch which closes when the vehicle accelerator pedal is initially depressed away from the stop position.

The output shaft of the DC motor has a sprocket wheel thereon which by means of a chain, drives a sprocket wheel mounted on the input shaft of an infinitely variable, automatic transmission. The output shaft of the transmission drives the rear axle of the vehicle through a second set of sprocket wheels and chain entrained thereon. The maximum output speed of the vehicle is established by taking into account the rated speed of the motor, the tooth ratios of the two sets of chain driven sprocket wheels and the maximum achievable speed transfer ratio of the automatic transmission which is chosen to suit the rated power of the electric motor.

Ratio control of the transmission is accomplished from the accelerator pedal. Depressing the accelerator increases the tension in a spring. Spring tension determines the input torque level at which the transmission changes ratio. As tension on the control spring is increased, pressure on a cam plate within the transmission is exerted to urge it toward a more eccentric position. Added eccentricity in the position of the cam plate decreases the input to output shaft turning ratio of the transmission.

It is to be noted that the whole ratio range of the transmission can be achieved at any specified accelerator setting. However, the more the accelerator is depressed, the greater will be the acceleration of the vehicle and the steeper the hill that can be climbed. The increased power to provide the acceleration comes from the motor but the conversion of battery energy to motive power is handled efficiently at all speeds and under all conditions. Other objects, features and advantages of my invention will be apparent from the following detailed description taken in conjunction with the accompanying drawings wherein an embodiment illustrating the principles of my invention has been selected for exemplification.

BRIEF DESCRIPTION OF THE DRAWINGS

FIG. 3 is a longitudinal section view of a stepless transmission embodying the present invention.

FIG. 4 is an end view taken along line 4—4 of FIG. 3, showing the slotted pin attached to the end of control cable.

DESCRIPTION OF THE PREFERRED EMBODIMENT

Figure 1:
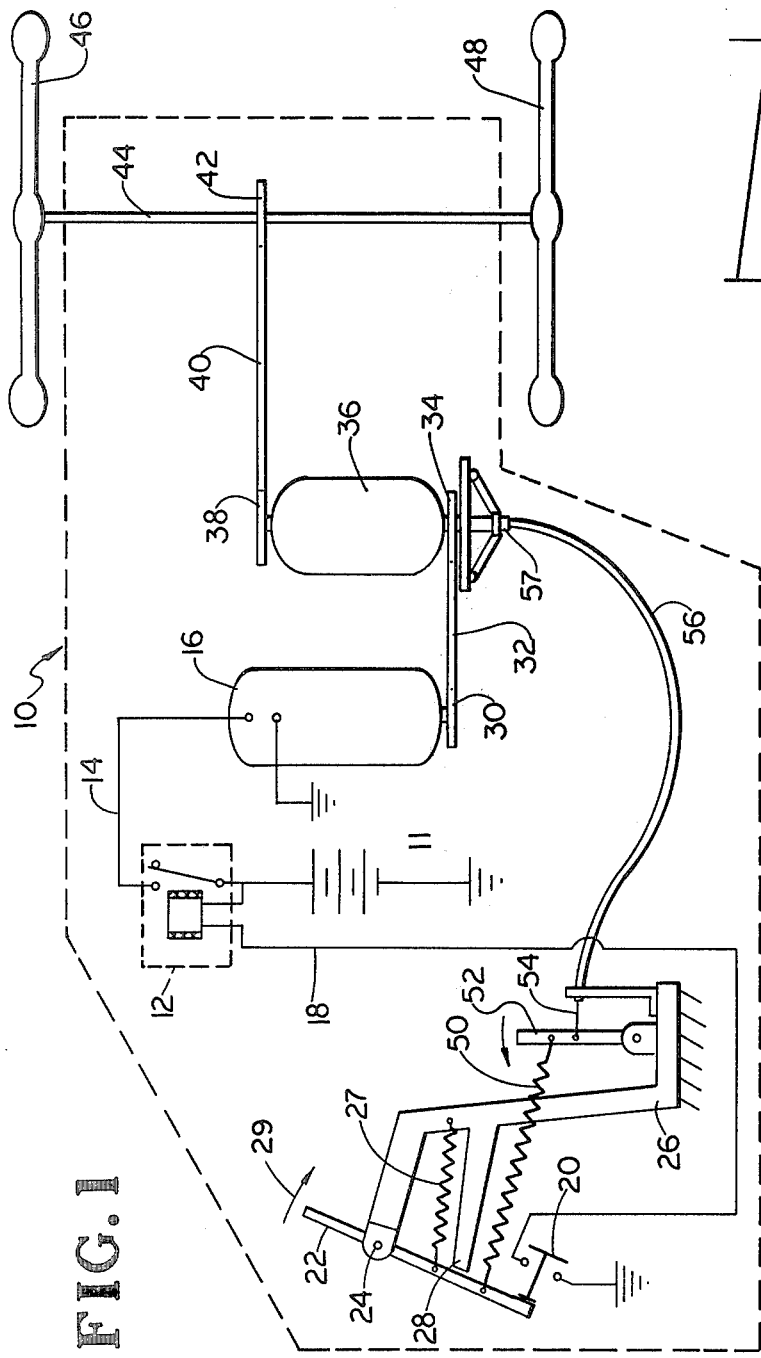
FIG. 1 is a diagrammatic view of the electric vehicle in accordance with the invention.

Referring now to the drawings where like numerals refer to like parts throughout the several views, there is shown in FIG. 1, an electric vehicle 10. Mounted in vehicle 10 is a battery 11. The negative terminal of battery 11 is grounded to the vehicle frame and the positive terminal of battery 10 is encircuited with both the energizing circuit and the relay circuit of electrical relay 12. The second terminal of the relay circuit is connected via wire 14 to the positive terminal of DC motor 16. The negative terminal of the motor is grounded. The second terminal of the energizing circuit of relay 12 is connected via wire 18 to one terminal of push button switch 20. The second terminal of push button switch 20 is grounded.

Push button switch 20 is actuated by accelerator pedal 22 which is pivotally mounted by pin 24 to frame structure 26. Frame structure 26 is integral with the chassis of vehicle 10. First spring 27 and stop 28 determine the neutral position of the accelerator pedal 22 which is that shown in FIG. 1. In its neutral position, accelerator pedal 22 will press against the center post of push button switch 20 keeping it in the open position. However, as soon as the accelerator pedal 22 is depressed in the direction shown by arrow 29, pressure on center post of switch 20 is relaxed, causing relay 12 to be energized. Energizing of relay 12 sends battery current to DC motor 16, starting it.

In the unit reduced to practice, battery 11 and motor 16 were both rated at 24 volts DC. A shunt wound DC motor was used.

The case of motor 16 is secured to the frame of vehicle 10 and the shaft of motor 16 has a sprocket wheel 30 mounted thereon. A first chain 32 is entrained on sprocket wheel 30. Chain 32 is also entrained on driven sprocket wheel 34 which is concentrically mounted on the input shaft of infinitely variable Waddington drive transmission 36. The case of transmission 36 is secured to the frame of vehicle 10. The output shaft of transmission 36 has mounted thereon a driving sprocket wheel 38. Entrained on sprocket wheel 38 is a second chain 40. Chain 40 is also entrained on differential sprocket wheel 42 which turns drive axle 44. Axle 44 is coupled for rotation to vehicle 10 and serves to rotate drive wheels 46 and 48.

Thus, when accelerator pedal 22 is depressed, switch 20 closes completing the circuit to supply current to the energizing coil of relay 12. This closes the switch contacts of relay 12 supplying power to motor 16. Starting of motor 16 turns first sprocket wheel 30 which by means of first chain 32 rotates the input shaft of transmission 36. Rotation of the transmission input shaft results in rotation of the output shaft of the transmission at a rate dependent on the operating gear ratio of the transmission which will later be described in detail. In any case, sprocket wheel 38 will be rotating at some speed whenever motor 16 runs. Through the entrained chain 40, axle 44 is turned supplying motive power to wheels 46 and 48, thereby moving vehicle 10 forward.

Control of infinitely variable automatic transmission 36 is accomplished by depressing accelerator pedal 22. As pedal 22 is depressed, a pull is exerted on spring 50. Pull on tension spring 50 tends to rotate lever 52 which is pivotally mounted on frame member 26. Also attached to lever 52 is center rod 54 of Bowden cable 56. The other end 57 of cable 56 attaches to the ratio control mechanism of transmission 36.

Figure 2:
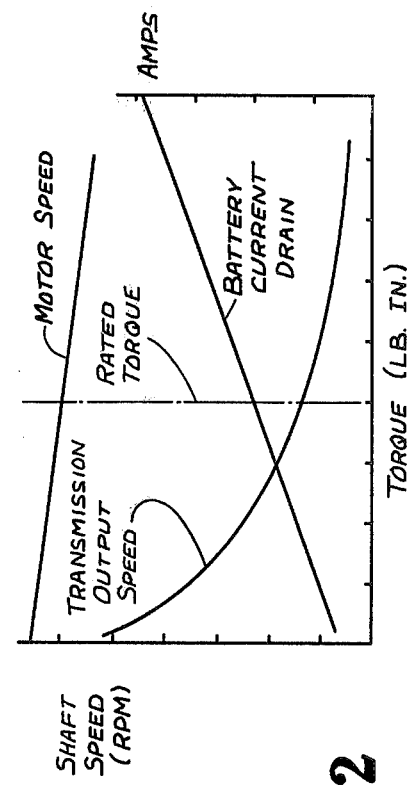
FIG. 2 depicts graphs of the shaft speed at the output of the motor and the transmission plotted against torque load on the vehicle.

FIG. 2 shows the response of the FIG. 1 system. Under no load conditions (The vehicle traveling downgrade), motor 16 will turn at maximum speed, battery drain will be low and the output shaft of the transmission will be turning at a maximum value. For full rated torque conditions (For example, accelerating the vehicle from a stop, on level terrain), the speed of motor 16 may drop off 10 percent from its no load value and the drain on the battery will increase. However, the output shaft of transmission 36 will, due to the load, be turning only a quarter as fast as it did under no load conditions. For torque requirements beyond full rated torque, a situation that might result from trying to accelerate while going up a steep hill, the ratio of motor speed to transmission output speed will continue to increase as shown in FIG. 2.

How the transmission accomplishes this is best explained by referring to FIG. 3. A cutaway view of transmission 36 is shown in FIG. 3. A central shaft 60 is journaled within housing 62. Sprocket 34 serves as the input and sprocket 38 is the output. Within housing 62 and between sprockets 34 and 38 is a Waddington drive mechanism comprising a major portion of a planetary gear assembly having one way clutches within each of the planet gears.

A series of planet gears 64 are journaled for rotation within housing 62 by means of roller bearings 65 and 66. As herein shown, particularly in FIG. 6, there are four planet gears with their axes at 90 degree intervals with respect to the axis of sun gear 68. The sungear and the planet gears mesh at teeth 69 and 70. Housing 62 acts as the planet carrier.

Sun gear 68 is secured to central shaft 60 by means of nut 72 which jointly presses sprocket 38 and sun gear 68 against shoulder 74. Pins 76 and 78 ensure that sun gear 68 drives sprocket 38. Dust cover 80 keeps dirt out of the gear assembly. A shoulder on the leading edge of sun gear 68 provides one support land for first ball bearing race 82. A flange 84 integrally formed on shaft 60 serves as a second support land for second ball bearing race 86.

Each of the planet gears 64 has a longitudinal axial bore 88 within which is telescoped an annular one-way clutch, generally indicated at 90. The input end of one-way clutch 90 has thereon an integral crank arm flange 94. The output end of one-way clutch 90 being secured to the interior side of planet gear 64 by attachment means 92. Further details of the one-way clutch configuration are given in my U.S. Pat. No. 3,803,932 beginning at line 59 of column 2. A Torrington clutch having part number RCB 101416-FS is typical of those used.

Figure 6:
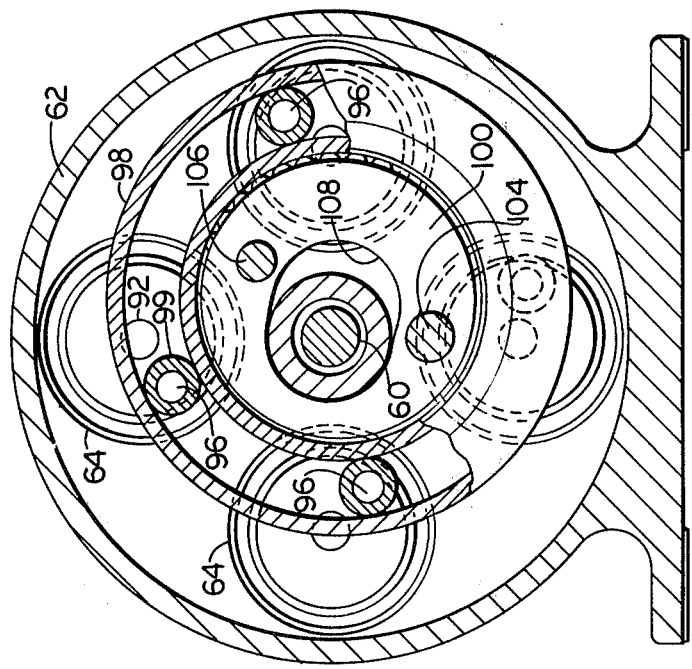
FIG. 6 is a cross sectional view of the transmission taken along line 6—6 of FIG. 3 showing the eccentric displacement of the cam plate follower.

As shown particularly in FIG. 6, the crank pin 96 which is integral with flange 94, rides in a slot in the side of annulus 98. A roller bearing 99 allows the crank pin 96 to move freely in the slotted annulus 98. The eccentricity of slotted annulus 98 with respect to the center of shaft 60 controls the ratio of the input to output speed of the transmission. Eccentricity is adjusted by means of ratio plate 100 (See also Fig. 3) which is mounted within slotted annulus 98 by means of ball bearing 102. Ratio plate 100 is pivotally mounted on pin 104. Pushing left on actuator pin 106 (See FIG. 6) tends to make ratio plate 100 concentric with control shaft 60. Pushing right on actuator pin 106 tends to move the ratio plate to the eccentric configuration depicted in FIG. 6. An arcuate slot in hub 108 on which driving sprocket wheel 34 is mounted permits the movement of the effective center of ratio plate 100 to a position which places the effective center of slotted annulus 98 a maximum distance from the center of shaft 60.

As may be seen in FIG. 3, input sprocket 34 is secured on hub unit 108 which is bearing mounted for rotation on its exterior surface in housing end 110. At its center, hub 108 is supported on shaft 62 by a pair of roller bearings 112 and 114. Since pivot pin 104 penetrates hub 108, ratio plate 100 makes a revolution everytime that sprocket 34 revolves. Consequently, for every 360 degree turn of sprocket 34, there is a cycle of revolution of slotted annulus 98. The magnitude of this cycle depends on how much the actuator pin has been rotated clockwise from an imaginary line passing through the center of control shaft 60 from the center of pin 104.

Figure 5:
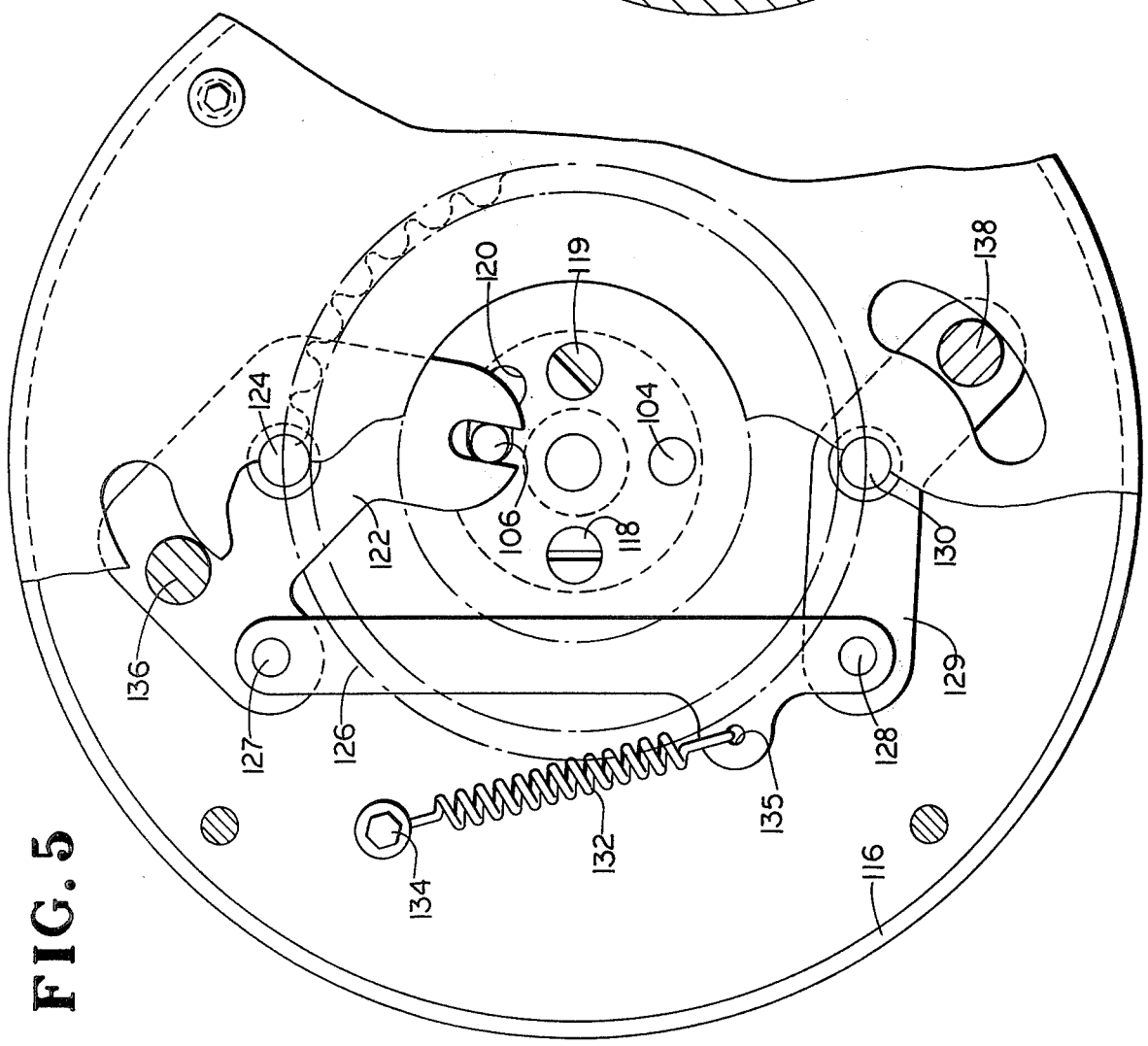
FIG. 5 is an end view partially cutaway taken along line 5—5 of FIG. 3, showing the cam actuated transmission ratio control mechanism.

Movement of ratio plate 100 into and out of an eccentric configuration is achieved by application of force to actuator pin 106. FIG. 5 shows how this is achieved. Flywheel 116 is secured on hub 108 by suitable means such as screws 118 and 119. Arcuate slot 120 in hub 108 permits actuator pin 106 to move laterally as viewed in FIG. 5, thereby rotating ratio plate 100 with respect to pin 104.

A slotted pivot plate 122 mounted for rotation by pin 124 to the face of flywheel 116 engages the extended end of actuator pin 106. At the second end of pivot plate 122, one end of connecting bar 126 is pivotally attached as by bolt means 127. The second end of connecting bar 126 is pivotally attached as by bolt 128 to one end of a second pivot plate 129, the middle of the second pivot plate being rotatably secured by pin 130 to a point on the face of flywheel 116 which makes both pins 124 and 130 concentric with respect to the flywheel center. Tension spring 132 is secured at one end to the face of flywheel 116 by means of bolt 134 and is attached to connecting bar 126 via opening 135 at its other end. Tension on spring 132 serves to draw actuator pin 106 to its most counterclockwise position as depicted in FIG. 5. The FIG. 5 depiction shows the transmission configuration which will position slotted annulus 98 so that it is essentially concentric with respect to central shaft 60. To move slotted annulus 98 to the position shown in FIG. 6, force must be applied to the second ends of pivot plates 122 and 129. The force must be applied such that it tends to stretch spring 132.

Counterclockwise rotation of pivot plates 122 and 129 about their respective pivot points 124 and 130 is accomplished as follows. There is mounted in the second end of pivot plate 122 a right angle projecting post 136. Similarly, post 138 projects from the second end of pivot plate 129. Referring now to FIG. 3, it can be seen that one end of connecting arm 140 is pivotally attached to the outward end of post 136. Attachment may be accomplished by means of a bolt 142. Similarly, one end of a second connecting arm 144 is secured by bolt 146 to the outward end of post 138. The second ends of connecting arms 140 and 144 are secured by pin means to first and second projections 145 and 146 that form an integral part of collar 148. An outward (To the right as viewed in FIG. 3) pull on cylindrical sleeve 150 causes collar 148 to move away from flywheel 116. This increases the included angle between connecting arms 140, 144 and the face of flywheel 116. Applying appropriate trigonometric theory, the result is that both posts 136 and 138 are drawn closer to the center of shaft 60 whenever sleeve 150 is pulled outward.

Pulling sleeve 150 outward is accomplished by means of control cable 56. Control cable 56 has an outer sheath 152 within which there is a center rod 54 that can slidably move lengthwise therein. The terminal end of outer sheath 152 has a bearing race 156 secured thereon. The periphery of bearing race 156 is secured in one end of tube member 158. The other end of tube member 158 is attached to the extending end of central shaft 60 by appropriate means such as a set screw. This arrangement allows the sheath of control cable 56 to remain stationary while tubing member 158 is free to rotate in synchronism with the turning of output sprocket 38 within which central shaft 60 is secured. The second end of center rod 54 terminates in a nipple 160. FIG. 4 shows the nipple configuration in cross section. A cruciform configuration is shown wherein each arm of the nipple extends through a slot in outer sheath 152. The several arms of the nipple 160 engage the inner face of bearing race 162. The outer face of bearing race 162 is retained within the inner end of sleeve 150.

Referring now to FIG. 1, it is seen that the first end of center rod 54 is moved in and out according to pressure applied to accelerator pedal 22. Pressure applied to accelerator pedal 22 tends to cause collar 150 to move outward on tube member 158 (See FIG. 3). This, acting through connecting arms 140 and 144, moves pivot plates 122 and 129 (See FIG. 5) such that actuator pin 106 is turned clockwise in arcuate slot 120. Rotation of actuator pin 106 in the clockwise direction causes slotted annulus 98 to assume the position depicted in FIG. 6.

Under constant load conditions on the electric motor, positioning of arcuate shoe 98 in the configuration shown in FIG. 6 results in sprocket wheel 38 turning faster with respect to transmission input sprocket wheel 34 than it would if pressure on the accelerator pedal was relaxed so that actuator pin 106 was in the FIG. 5 configuration.

Since accelerator pedal 22 can be depressed to any one of a continuum of positions, there will result a continuum of input-to-output speed transfer ratios at the automatic transmission 36.

It is to be understood that while the embodiment shown in FIG. 1 uses chain drives between the electric motor and the transmission and between the transmission and the rear axle, there are other ways to couple the transmission in the drive train. Further, the use of flywheel 116 served both as a convenient way to mount the control mechanism and at the same time served a useful function as an energy storage media. This is because the flywheel rotates whenever the input sprocket wheel 34 is driven by the electric motor. Thus, whenever the operator suddenly tromps on the accelerator, which act would greatly increase the load on the electric motor, the energy stored in the flywheel would help in taking up the surge in energy needs.

This invention provides a torque responsive transmission for an electric powered vehicle which allows the motor to run at constant speed under all operating conditions. This results in a very efficient electric vehicle.

In actual practice, the operator will be constantly changing the throttle setting, thus varying both input torque and the horsepower. However, at no time can the current drawn by the motor exceed that required to produce rated torque and horsepower.

While the vehicle shown in FIG. 1 has provisions only to move forward, it should be understood that a reversing gear could be added which would allow the vehicle to back up. Regenerative braking can also be provided through use of a separate high speed generator geared from the transmission output shaft. This generator could then be clutched in by means of the brake pedal to provide both a braking load and to recharge the battery. For vehicles which require only a low speed reversing capability, the same generator could also be used as a motor to provide a back up capability.

It is to be understood that whilst in the embodiment described, the torque setting of the transmission is fixed directly by the pressure of the operator's foot, a power assist can readily be added for larger transmissions such as might be used in freight hauling vehicles.

I claim:

1. An electric drive and control system for a vehicle having a frame and a drive wheel rotatably supported by said frame, said system comprising:

a power source supported on the vehicle frame for providing motive energy;

an electric motor mounted on said frame and encircuited to receive energy from the power source, said motor having an output shaft which rotates when said motor is powered by the power source;

a stepless torque responsive automatic transmission mounted on said frame and having an input element and an output element, both being journaled for rotation, said input element being drivingly connected to the output shaft of said motor, said output element being drivingly connected to the drive wheel of said vehicle, said automatic transmission including ratio plate means for establishing the input torque level about which the transmission will change ratio, said transmission automatically adjusting its transfer ratio to accommodate the difference torque requirements between the vehicle drive wheel and the input element;

an accelerator pedal having a pivotal mounting point, said mounting being to the frame of said vehicle;

a first spring having one end attached to the accelerator pedal, the second end of said spring being anchored to said vehicle frame, said spring serving to urge said accelerator pedal to a neutral position;

a tension spring having one end attached to a location on said accelerator which is remote from said pivotal mounting point, thereby allowing the second end of said tension spring to move in and out in response to pressure applied to said accelerator pedal; and connecting means between the second end of said tension spring and said ratio plate, said connecting means translating pressure on said accelerator pedal to an increased eccentricity of said ratio plate thereby raising the torque requirements at said input element of the transmission.

2. The invention as described in claim 1 wherein the stepless torque responsive automatic transmission includes:

a housing, a central shaft journaled for rotation in said housing, at least two planet gears, each journaled for rotation in said housing, said planet gears being equally spaced from one another, the center of each gear being at an equal distance from said central axis, a sun gear secured on said central shaft, said sun gear making positive engagement with each of said planet gears, coupling means between said sun gear and said output element, at least two one-way clutches, one clutch being telescoped within the longitudinal axial bore of each of said planet gears, the output of each clutch being secured to the planet gear in which said clutch is telescoped, the input of each clutch having a crank pin extending therefrom, a slotted annulus slidably engaging the extending end of each of said crank pins, said annulus being positioned perpendicular to said central axis of said transmission, ratio plate means including a cylindrical disk attached by bearing means to said slotted annulus, a driving connection between said ratio plate and said input element, said connection including a pivot pin eccentrically fixed in said ratio plate and journaled in the hub of said input element, thereby permitting the radial displacement of said ratio plate to positions of varying eccentricity relative to the axis of said input element, and means for transmitting the rotational motion of said input element to the input ends of the multiplicity of one-way clutches thereby causing the planet gears to drive the sun gear at an input-output ratio generally proportional to the eccentricity of said ratio plate.

3. The invention as described in claim 1 wherein the power source is a battery.

4. The invention as described in claim 3 wherein the means for controlling the delivery of battery power to the electric motor includes encircuiting an electrical relay between said battery and said motor, the energizing circuit for the relay including an activating switch whereby the vehicle operator has the ability to stop or start said electric motor.

5. The invention as described in claim 4 wherein a shunt wound DC motor is used.

6. The invention as described in claim 1 wherein the input element of the stepless torque responsive transmission includes a flywheel having an axis coinciding with the axis of said transmission, said flywheel being secured to the hub of said input element.

7. The invention as described in claim 6 wherein the output shaft of said electric motor is drivingly connected to the input element of said transmission by chain and sprocket wheel means.

8. The invention as described in claim 1 wherein the driving means between the output element of said transmission and the drive wheels of said vehicle includes means for reversing the motive direction of the vehicle.

9. The invention as described in claim 1 wherein the speed of the electric motor varies by less than 10 percent between no-load and full load power conditions.

* * * * *

UNITED STATES PATENT AND TRADEMARK OFFICE
CERTIFICATE OF CORRECTION

PATENT NO. : 4,256,196
DATED : March 17, 1981
INVENTOR(S) : Clive Waddington

It is certified that error appears in the above-identified patent and that said Letters Patent are hereby corrected as shown below:

Column 3, line 65, please insert the word ---tension--- after the word "on".

Column 7, line 37, please insert the word ---in--- after the word "difference".

Signed and Sealed this

Second Day of June 1981

[SEAL]

Attest:

RENE D. TEGTMEYER

Attesting Officer     Acting Commissioner of Patents and Trademarks